(12) United States Patent
Oi (10) Patent No.: US 6,343,772 B1
(45) Date of Patent: Feb. 5, 2002

(54) HOSE CLAMP WITH POSITIONING FUNCTION

(75) Inventor: Shigeo Oi, Aichi (JP)

(73) Assignee: Togo Seisakusyo Corporation, Aichi (JP)

( * ) Notice: Subject to any disclaimer, the term of this patent is extended or adjusted under 35 U.S.C. 154(b) by 0 days.

(21) Appl. No.: 09/516,249

(22) Filed: Mar. 1, 2000

(30) Foreign Application Priority Data

Mar. 2, 1999 (JP) ............................................ 11-054760

(51) Int. Cl.[7] ............................................. F16L 33/025
(52) U.S. Cl. .............................. 248/75; 248/65; 248/79; 285/23; 285/242; 285/252
(58) Field of Search .............................. 248/65, 75, 79; 285/242, 252, 23, 253

(56) References Cited

U.S. PATENT DOCUMENTS

| | | | | |
|---|---|---|---|---|
| 5,234,233 A | * | 8/1993 | Fix ................................ | 285/23 |
| 5,456,784 A | * | 10/1995 | Codgill et al. ............... | 156/229 |
| 5,616,205 A | * | 4/1997 | Codgill et al. ............... | 156/229 |
| 5,622,391 A | * | 4/1997 | Belik ........................... | 285/23 |
| 5,630,255 A | * | 5/1997 | Eliasson .................... | 24/274 R |
| 5,675,871 A | | 10/1997 | Webb et al. | |
| 5,820,166 A | | 10/1998 | Webb | |
| 5,915,739 A | * | 6/1999 | Cradduck et al. ........... | 285/114 |
| 5,996,186 A | * | 12/1999 | Yamada et al. ............. | 24/20 R |
| 6,038,744 A | * | 5/2000 | Zielinski ...................... | 24/20 R |
| 6,088,886 A | * | 7/2000 | Gyongyosi ................... | 24/279 |

FOREIGN PATENT DOCUMENTS

WO      WO 99 09344 A      2/1999

* cited by examiner

Primary Examiner—Anita King
Assistant Examiner—Steven Marsh
(74) Attorney, Agent, or Firm—Wenderoth, Lind & Ponack, L.L.P.

(57) ABSTRACT

A hose clamp includes a clamping body formed by bending a band-shaped spring plate into a generally circular shape flexibly deformed into a contracted state and a spread state. The clamping body is attached to a hose before the hose is connected to a pipe. A holder is mounted on the clamping body to hold the clamping body in the spread state in which the clamping body is loosely fitted with an end of the hose. The holder releases the clamping body from the spread state so that the clamping body is deformed into the contracted state in which the clamping body clamps a junction of the hose and the pipe. A positioner positions the clamping body at the end of the hose, the positioner including a clamp retainer attached to an outer circumference of the clamping body and a locking element which engages the hose to prevent the clamping body from displacing axially and circumferentially with respect to the hose.

17 Claims, 10 Drawing Sheets

HOSE CLAMP WITH POSITIONING FUNCTION

BACKGROUND OF THE INVENTION

1. Field of the Invention

This invention relates generally to hose clamps clamping a hose end, and more particularly to a hose clamp of the holder type which includes a separate holder holding a clamping body of the hose clamp in a spread state.

2. Description of the Prior Art

Hose clamps have conventionally been provided which are formed by circularly bending a band-shaped spring member and which clamp a hose with the spring force thereof. The hose clamp is previously deformed against an inherent spring force into a spread state so that it can readily be fitted with a hose. Thereafter, the hose clamp is released from the spread state so as to be capable of clamping the hose. The hose clamps are roughly divided into two types. In one type, a holder separate from a clamping body of the hose clamp is used to hold the clamping body in the spread state (holder type). In the other type, a locking means is provided integrally on both ends of the clamping body (holderless type). The locking means comprises a pair of radially protruding raised portions. In the hose clamps of the holder type, the holder is pulled out so that the clamping body is released from the spread state. On the other hand, in the holderless type, the raised portions of the clamping body are moved relative to each other so that the clamping body is released from engagement with the locking means. Japanese Utility Model Registration Publication Nos. 5-83580 and 6-69581 disclose hose clamps of the holderless type.

The hose clamp of both types cannot clamp the connected portion of the hose correctly when fitted with the hose in the spread state but displaced axially with respect to the hose. Further, the holder needs to be pulled out and the locking means needs to be disengaged so that the clamping body is released from the spread state, as described above. For this purpose, the holder or locking means needs to be positioned in the direction in which a releasing tool is inserted. Accordingly, the hose clamp should not be displaced circumferentially with respect to the hose. When used, particularly to clamp a radiator hose in a narrow space such as an engine room of an automobile, the hose clamp cannot be moved to be re-positioned easily.

SUMMARY OF THE INVENTION

Therefore, an object of the present invention is to provide a hose clamp with a positioner which can correctly position the clamping body relative to the hose.

The present invention provides a hose clamp comprising a clamping body formed by bending a band-shaped spring plate into a generally circular shape flexibly deformed into a contracted state and a spread state. The clamping body is attached to a hose before the hose is connected to a pipe. A holder is provided on the clamping body to hold the clamping body in the spread state in which the clamping body is loosely fitted with an end of the hose. The holder releases the clamping body from the spread state so that the clamping body is deformed into the contracted state in which the clamping body clamps a junction of the hose and the pipe. A positioner positions the clamping body at the end of the hose. The positioner includes a clamp retainer attached to an outer circumference of the clamping body and a locking element which engages the hose to prevent the clamping body from displacing axially and circumferentially with respect to the hose.

According to the above-described construction, the clamping body held in the spread state by the holder is attached to the clamp retainer of the positioner when the hose clamp is fitted with the hose end to clamp the same. As a result, the clamping body and the positioner are joined together. In this state, the hose clamp is loosely fitted with the hose end. The positioner engages the hose such that the clamping body is prevented from displacing axially and circumferentially with respect to the hose. Consequently, since the clamping body is held in a desired position relative to the hose, the holder can readily be detached from the clamping body.

BRIEF DESCRIPTION OF THE DRAWINGS

Other objects, features and advantages of the present invention will become clear upon reviewing the following description of the preferred embodiment, made with reference to the accompanying drawings, in which.

DETAILED DESCRIPTION OF THE PREFERRED EMBODIMENTS

Figure 1:
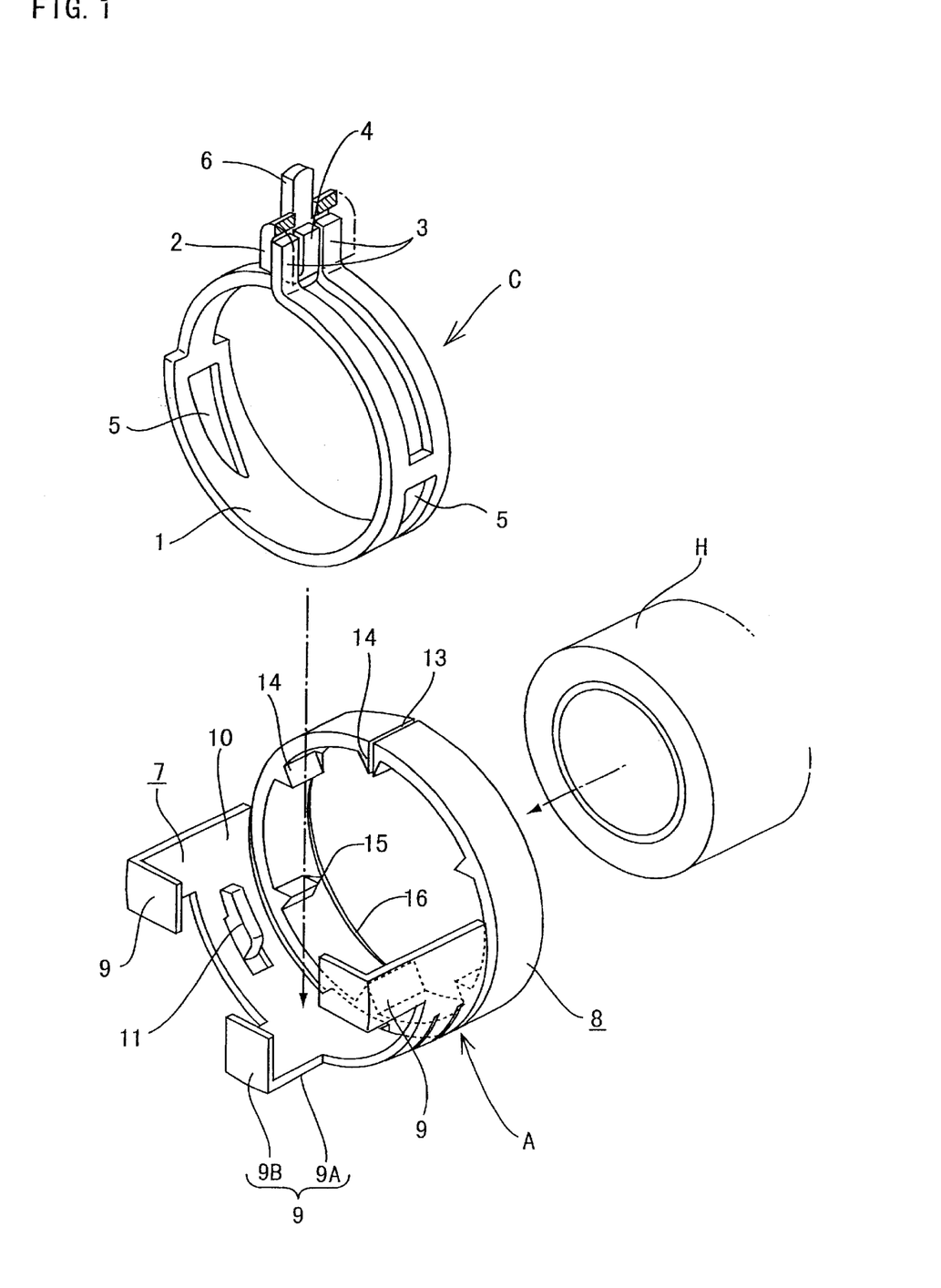
FIG. 1 is an exploded perspective view of the hose clamp of one embodiment in accordance with the present invention, with a positioner being removed from a clamping body.
Figure 2:
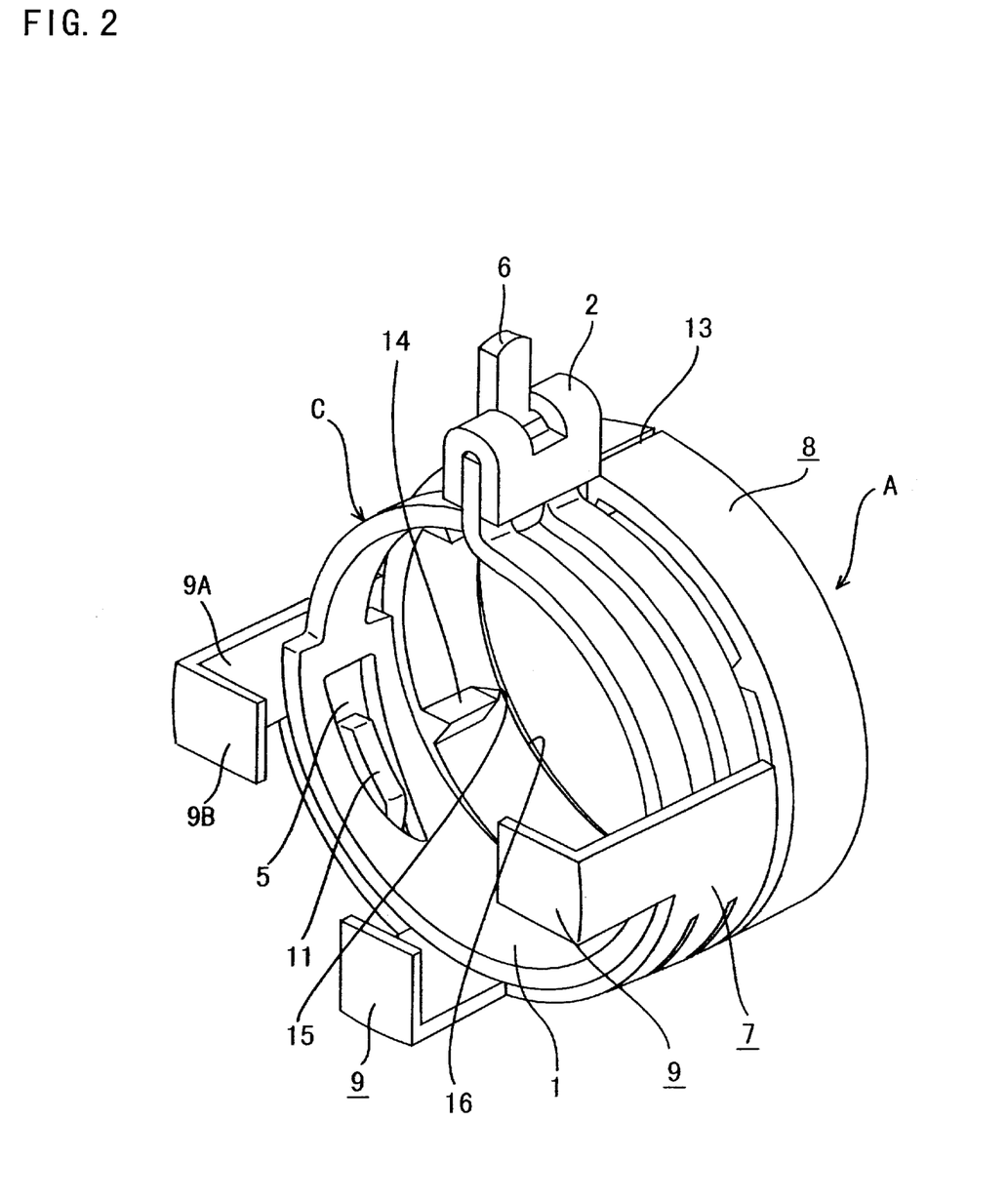
FIG. 2 s a perspective view of the hose clamp attached to the positioner.
Figure 3:
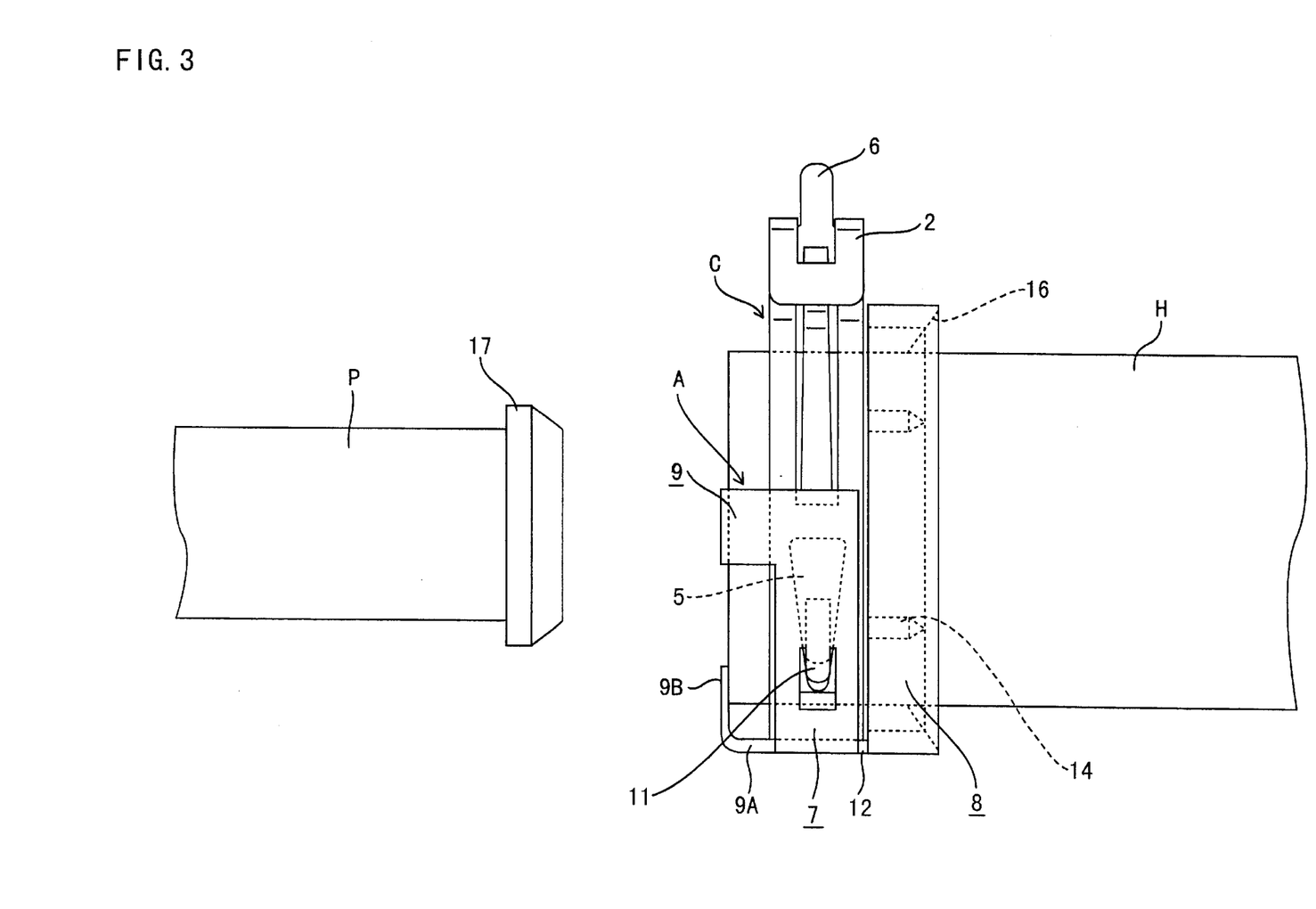
FIG. 3 is a front view of the hose clamp connecting to a pipe.
Figure 4:
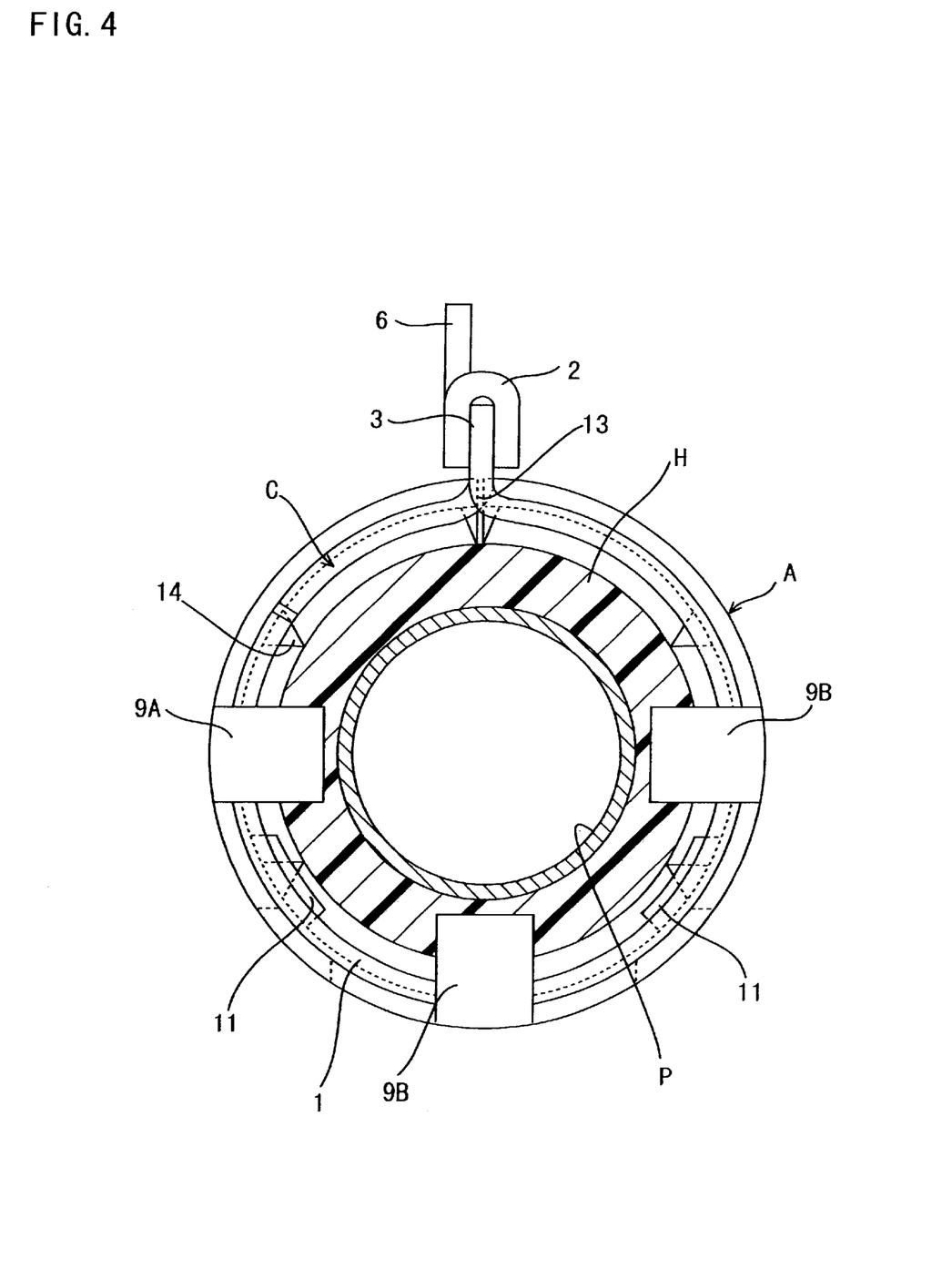
FIG. 4 is a sectional view of the hose clamp loosely fitted with the hose in a spread state.
Figure 5:
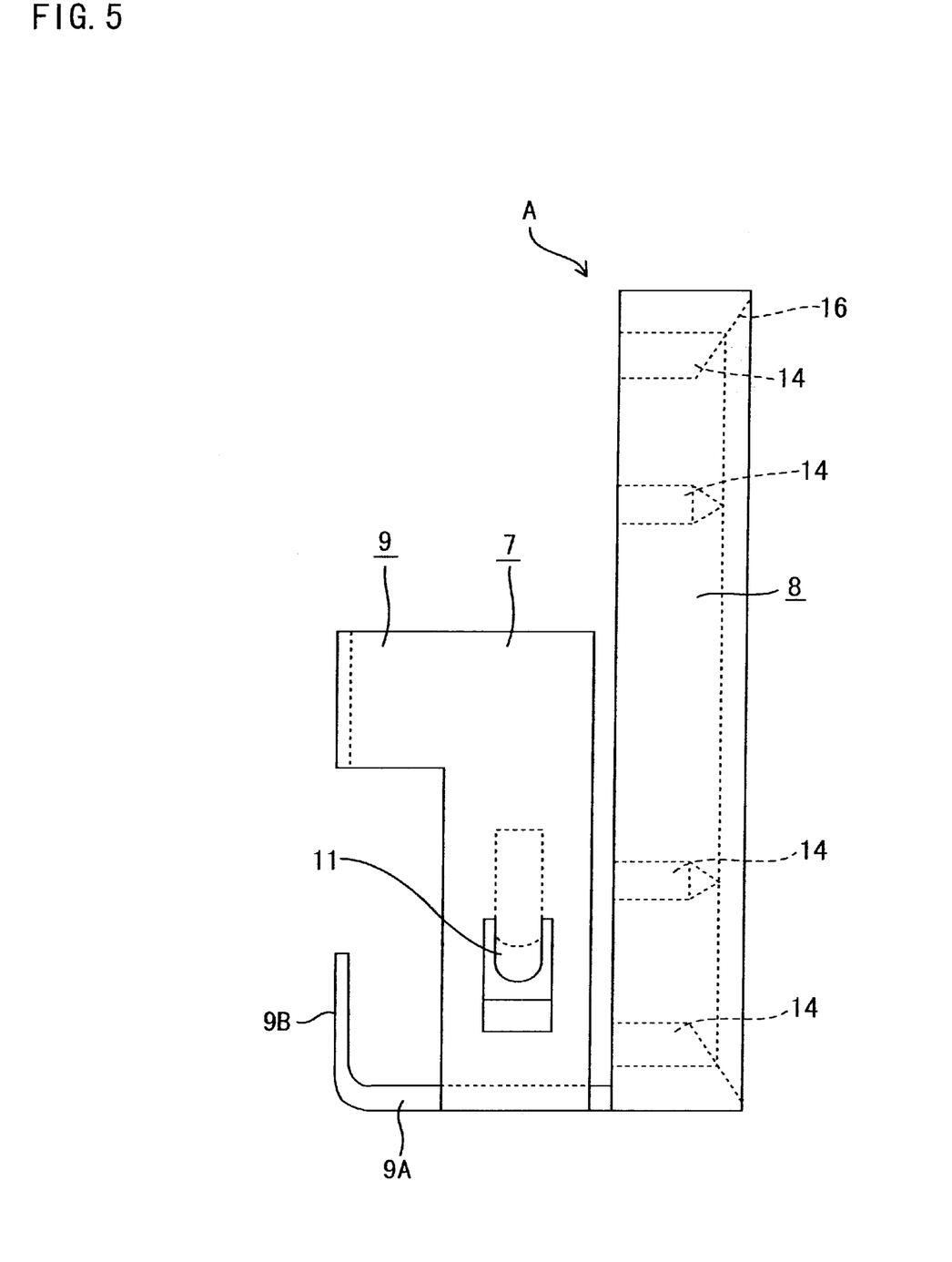
FIG. 5 is a side view of the positioner.
Figure 6:
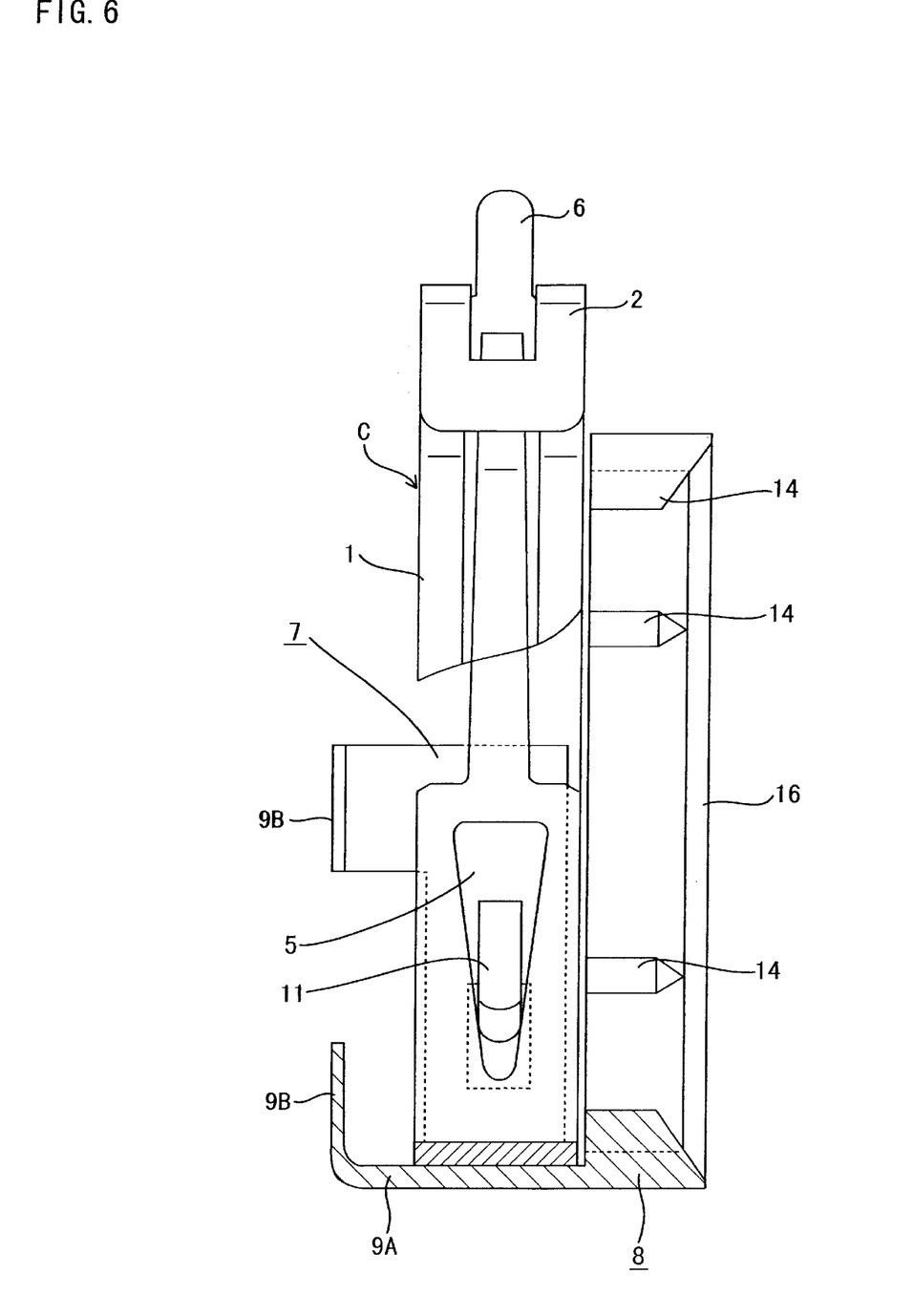
FIG. 6 is a sectional view of the hose with the positioner, showing the engagement of a locking protrusion with a triangular window.
Figure 7:
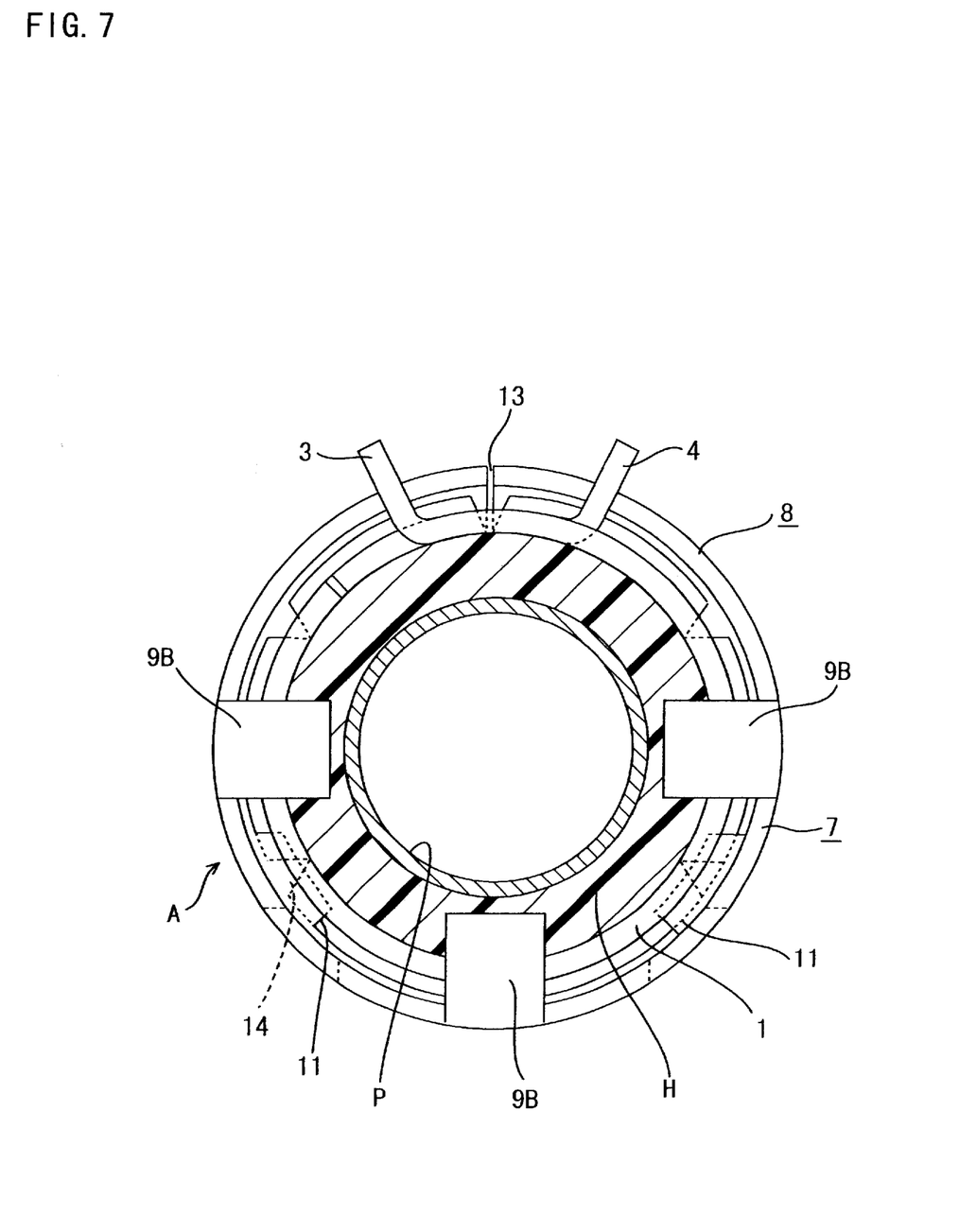
FIG. 7 is a sectional view of the hose clamp clamping the hose.

Two embodiments of the present invention will be described with reference to the accompanying drawings. Referring to FIG. 1, a hose clamp C of a first embodiment is shown. The hose clamp C comprises a clamping body 1 and a holder 2 holding the clamping body in a spread state. The clamping body 1 is formed by bending a band-shaped spring plate into a generally circular shape and can be flexed so that a diameter thereof is spread and contracted. One of two ends of the clamping body 1 is bifurcated. The bifurcated portions include distal ends raised radially outward so that the distal ends serve as first raised portions 3. The other end of the clamping body 1 is narrowed so as to be inserted into a space between the first raised portions 3. The narrowed end includes a radially raised distal portion serving as a second raised portion 4. The clamping body 1 has a pair of triangular windows 5 opposed to each other. The triangular windows 5 serve to apply a uniform clamping force to the overall circumference of a hose H, as is well known in the art.

The clamping body 1 assumes a contracted state by the spring force thereof in its natural state such that the raised portions 3 and 4 are spaced from each other. The raised portions 3 and 4 are caused to come close to each other so that the clamping body 1 assumes a spread state. A holder 2 is then attached to the clamping body 1 so as to straddle the raised portions 3 and 4, whereupon the clamping body is held in the spread state. The holder 2 is formed into an inverted U-shape and has a width as large as or smaller than the clamping body 1. The holder 2 has a knob 6 protruding from a central top thereof. The knob 6 is gripped by a suitable tool so that the holder 2 is pulled out.

A positioner A will now be described. The positioner A is made of a synthetic resin and includes a clamp retainer 7 to which the hose clamp C is attached, a detent 8 preventing a circumferential displacement of the hose clamp C relative to the hose H, and hooks 9 preventing an axial displacement of the hose clamp C relative to the hose H. The clamp retainer 7 has substantially the same width as the clamping body 1 and is formed into a generally semi-circular shape so that the clamping body 1 in the spread state is inset through an upper opening 10 into the retainer. The clamp retainer 7 is flexible so that the opening 10 is spread. Thus, the clamp retainer 7 is spread when the clamping body 1 in the spread state is inset into it. The clamp retainer 7 has an inner circumferential face formed so as to adhere close to and conform to an outer circumferential face of the clamping body 1, whereupon the clamp retainer 7 can elastically retain the clamping body 1. The clamp retainer 7 further has a pair of locking protrusions 11 which are formed on the inner circumferential face thereof so as to engage the triangular windows 5 respectively. Consequently, when the hose clamp C is fixed to the clamp retainer 7, the hose clamp C retained in the clamp retainer is prevented from both axial and circumferential displacement.

The clamp retainer 7 has three hooks 9 formed to prevent axial displacement of the clamping body 1 and the positioner A relative to the hose H. The hooks 9 are spaced from one another, that is, two of the hooks 9 are positioned at both ends of the clamp retainer 7, and the other is located at the central bottom of the clamp retainer. Each hook 9 includes an extension 9A extending from the clamp retainer 7 lengthwise with respect to the hose H and a stopper 9B formed by bending a distal end of the extension 9A radially inward with respect to the hose H. Each stopper 9B has such a length that it is caught by an end face of the hose H but does not extend into the interior of the hose H when the positioner A has been attached to the hose.

The detent 8 is located at the side opposite to the hooks 9. A connecting piece 12 is disposed on the central bottom of the clamp retainer 7 to connect the detent 8 to the clamp retainer. The detent 8 is formed into a generally annular shape so as to be loosely fitted with the hose H. The detent 8 is coaxial with the clamp retainer 7. The detent 8 has an expanding slot 13 formed at the top thereof as viewed in FIG. 1, whereupon the detent 8 is spreadable. The detent 8 further has a plurality of biting protrusions 14 formed on the inner circumference thereof at the intervals of 60 degrees. One of the biting protrusions 14 is formed at the top thereof and can be separated by the expanding slot 13 into two halves.

Each biting protrusion 14 is formed into the shape of a triangular pole extending over the entire width of the detent 8. Each biting protrusion 14 has a top edge engaging the hose H so as to bite into the outer circumference of the hose. As a result, the positioner A and accordingly the hose clamp C can be prevented from inadvertent circumferential displacement relative to the hose H. In order that the detent 8 having the biting protrusions 14 may smoothly be fitted with the hose H, both sides of each protrusion 14 at its side opposite to the clamp retainer 7 are chamfered such that each protrusion has an inclined central edge 15. For the same purpose, the overall circumferential edge of the detent 8 at its side opposite to the clamp retainer 7 is formed into a chamfered face having such a gradient that the chamfered face is continuous with the inclined edge 15.

The operation of the hose clamp will now be described. First, the hose clamp C in the spread state is attached to the positioner A such that they are integrated together. In the attachment, the hose clamp C is pushed through the opening 10 into the clamp retainer 7 with the holder 2 side being positioned at the top. The clamp retainer 7 then receives the hose clamp C while being spread. The clamp retainer 7 returns to its former state when the lower side of the hose clamp C abuts against the bottom thereof. The clamp retainer 7 circumferentially adheres closely to the clamping body 1, holding the latter with elasticity. At this time, both protrusions 11 are fitted into the corresponding triangular windows 5, engaging the ends of the windows, respectively. As a result, the hose clamp C is accommodated in the positioner A in a state where circumferential and axial displacements of the hose clamp are limited.

The positioner A integrated with the hose clamp C in the spread state is fitted with the hose H. More specifically, the detent 8 is loosely fitted with the hose H with the holder 2 being maintained at the top. In this case, the tapered chamfered face 16 of the detent 8 and the inclined edges 15 of the biting protrusions 14 prevent the detent 8 from interfering with the end face of the hose H when the positioner A is fitted with the hose H. Further, the detent 8 can be spread by the expanding slot 13. Consequently, the positioner A is smoothly fitted with the hose H. The positioner A is pushed until the stoppers 9B of the hooks 9 abut against the end face of the hose H. Further, since the biting protrusions 14 engage the overall outer circumference of the hose H so as to bite into it, the positioner A is prevented from displacing or turning circumferentially relative to the hose. The hose clamp C integrated with the positioner A is thus positioned axially and circumferentially with respect to the hose H to be attached to the hose in the spread state.

Thereafter, the hose H is connected to the pipe P. The pipe P has a circumferential flange 17 at one end thereof. Accordingly, the hose H is partially deformed to spread when passing through the flange 17. However, the detent 8 spreads independently of the clamp retainer 7 when passing through the flange 17. Thus, the detent 8 smoothly passes through the flange 17 and accordingly, the hose H is smoothly connected to the pipe P.

Upon connection of the hose H to the pipe P, the holder 2 is pulled out. Since the hose clamp C is reliably positioned axially and circumferentially as described above, the holder 2 is reliably held to be directed to the worker. The worker then holds the grip 6 with a tool, pulling it out. When the holder 2 is pulled out, the clamping body 1 translates by its elasticity into the contracted state, clamping the hose H. The positioner A is left on the hose H.

According to the foregoing embodiment, the hose clamp C assuming the spread state can be positioned axially and circumferentially with respect to the hose H. Consequently, the hose clamp C can smoothly be released from the spread state. Further, the clamp retainer 7 and detent 8 are deformed to spread independent of each other. Accordingly, the clamp retainer 7 and detent 8 independently spread when the hose clamp C is attached to the clamp retainer or when the flange 17 of the pipe P passes through the detent 8. Consequently, the clamp retainer 7 and detent 8 can be deformed readily and smoothly and an amount of operation load can be reduced.

The connecting piece 12 connects the detent 8 to the clamp retainer 7 in the foregoing embodiment. However, the connecting piece may extend over the overall circumferential edge of the clamp retainer 7, instead. Further, the stoppers 9B of the hooks 9 are caught by the end face of the hose in the foregoing embodiment. Alternatively, each stopper 9B may be folded back to be formed into an engagement claw which bites into the end face of the hose.

Figure 8:
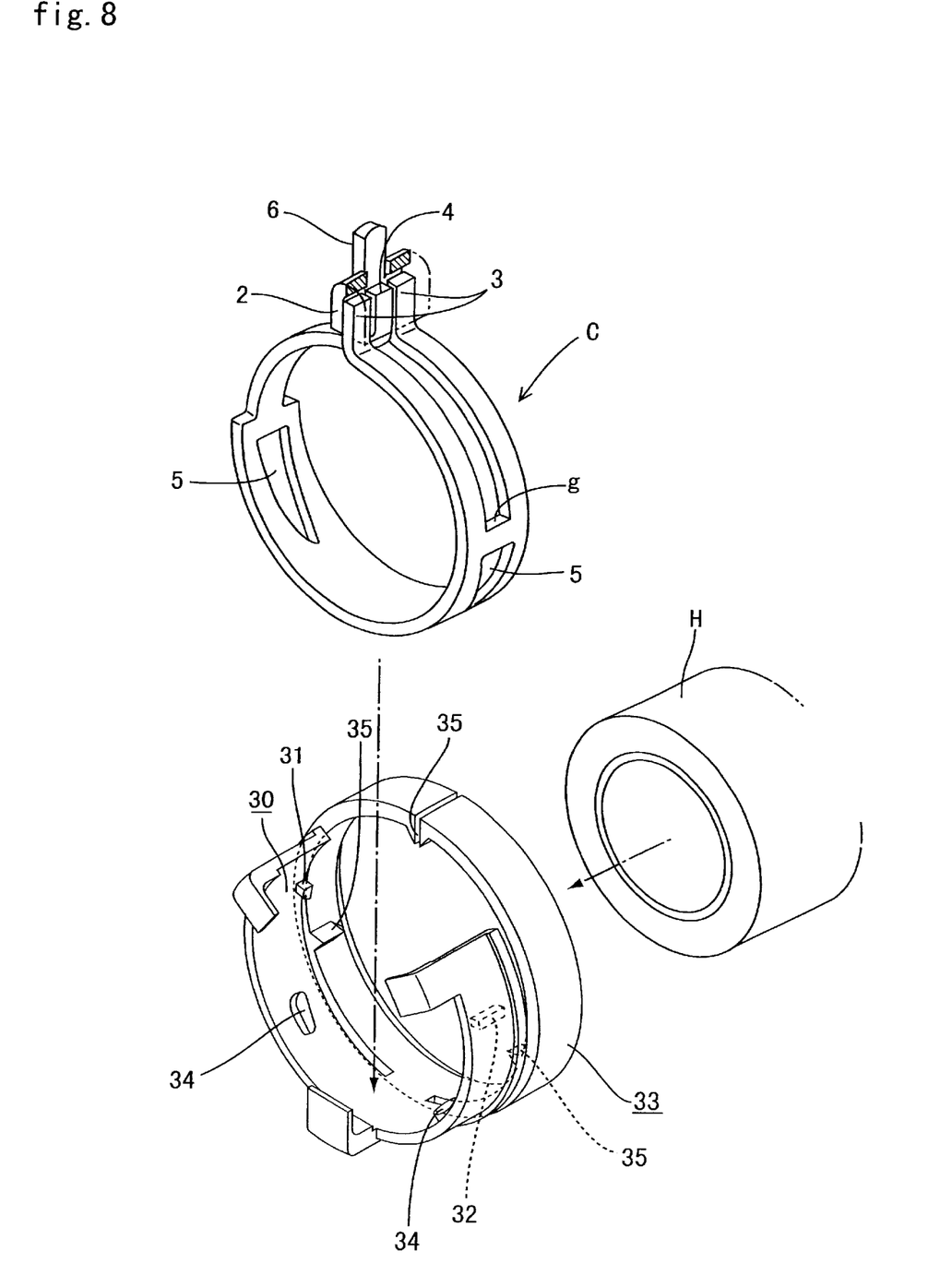
FIG. 8 is a perspective view of the hose clamp of another embodiment in accordance with the invention, showing another form of positioner.
Figure 9:
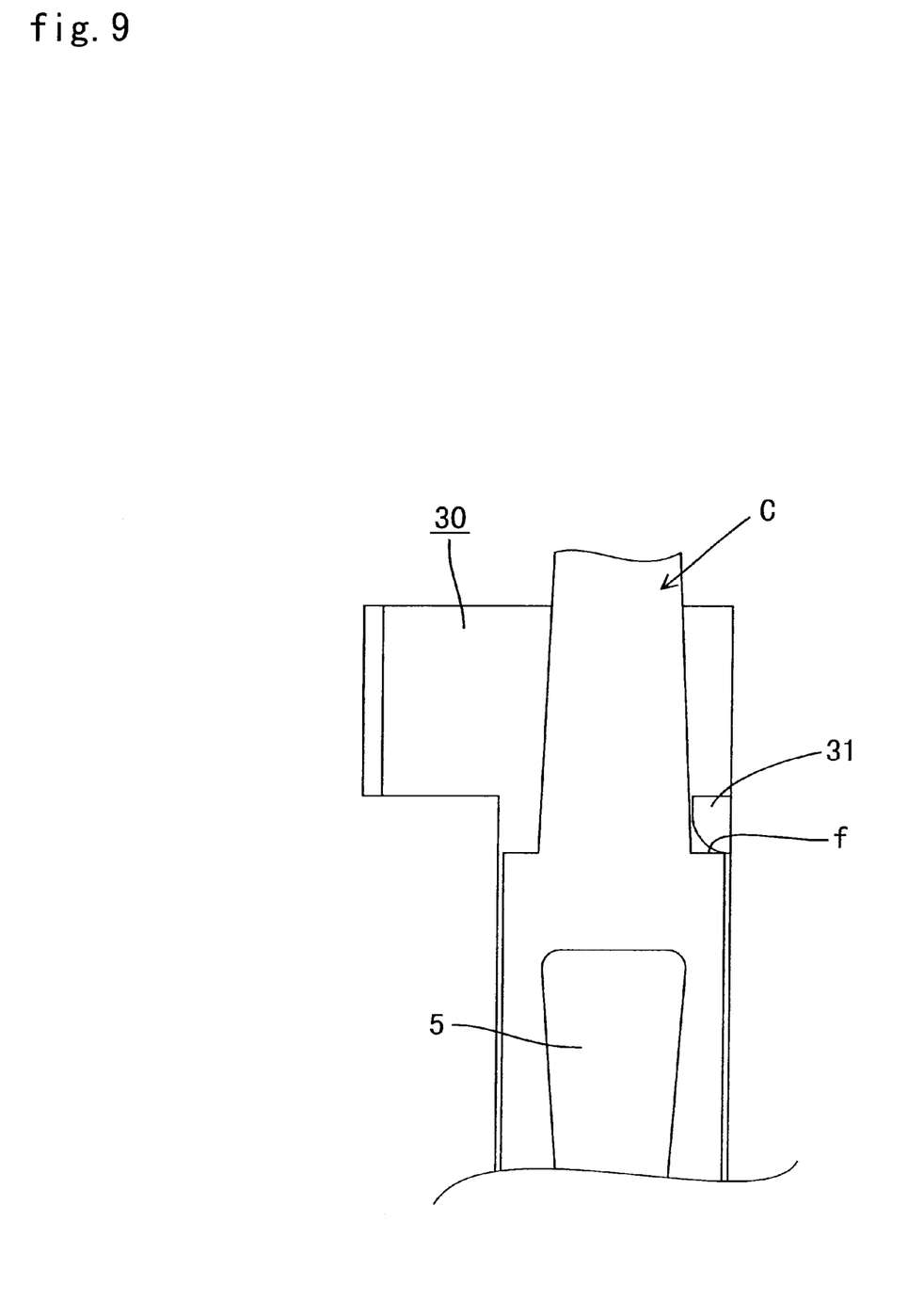
FIG. 9 is a enlarged partial side view of the hose clamp, showing the engagement of one of stopper protrusions.
Figure 10:
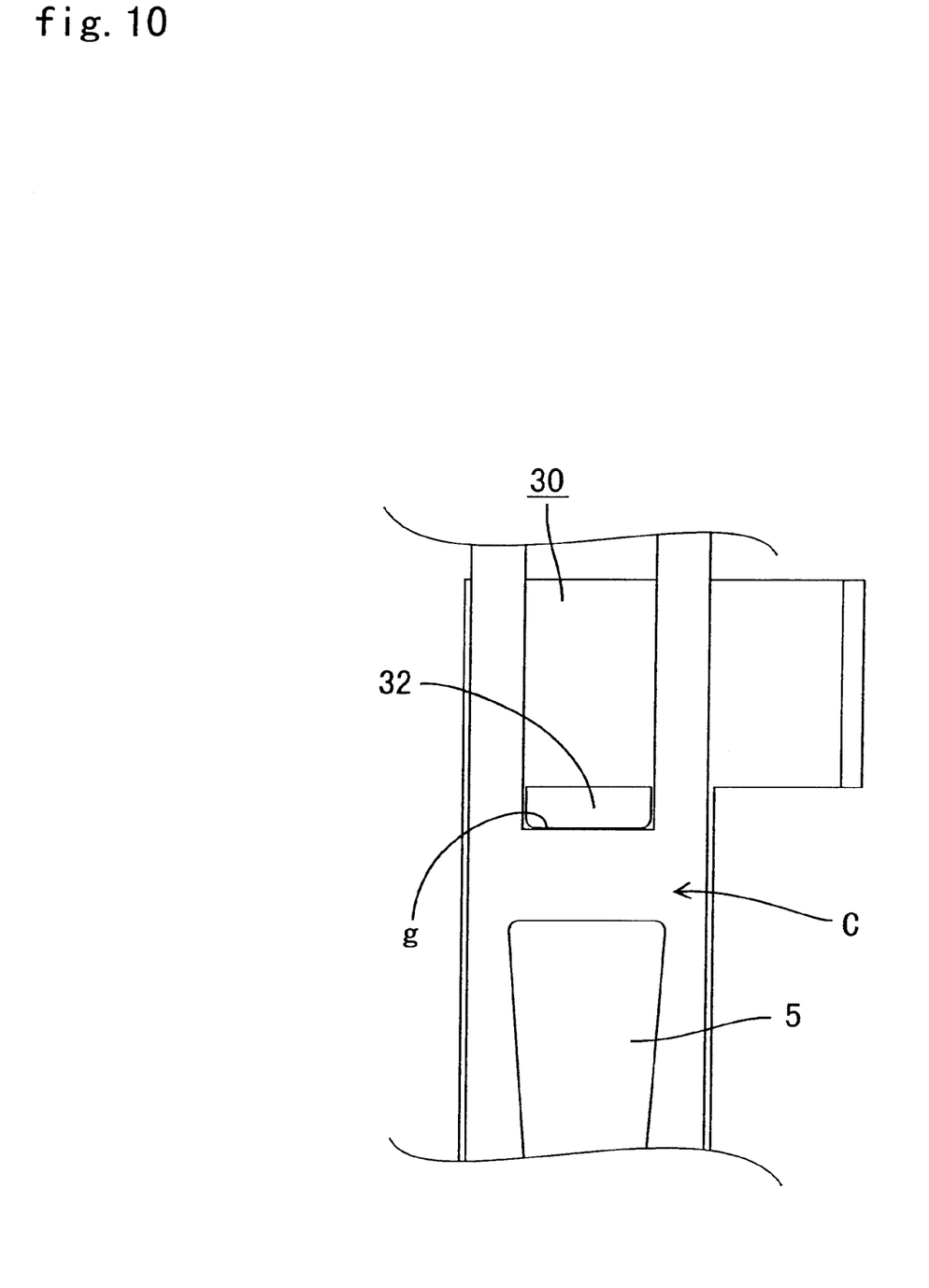
FIG. 10 is an enlarged partial side view of the hose clamp, showing the engagement of an other stopper protrusion.

FIGS. 8 to 10 illustrate another embodiment of the invention. This embodiment is directed to another form of positioner. A clamp retainer 30 has a larger angular range than that described above in the foregoing embodiment. The clamp retainer 30 has a range of about 240 degrees in this embodiment, whereas the clamp retainer 7 has a range of about 180 degrees in the foregoing embodiment. The clamp retainer 30 has two stoppers 31 and 32 formed near both ends on the inner circumferential face thereof respectively. The stopper 31 is disposed near the edge of the clamp retainer 30 at the detent 33 so as to engage a root portion of clamping body 1 at the second raised portion 4 side or a boundary f between the wide and narrow portions as shown in FIG. 9. The other stopper 32 is formed on the widthwise middle of the clamp retainer 30 so as to engage an end g of a groove resulting from the bifurcation at the first raised portion 3 side as shown in FIG. 10. Both stoppers 31 and 32 engage the hose clamp C to prevent turning of the hose clamp along with the protrusions 34. Addition of the stoppers 31 and 32 can compensate the detent function, for example, when each protrusion cannot provide a sufficient hook height for the corresponding triangular window of the hose clamp or, more specifically, when each protrusion has a smaller height than in the first embodiment or when the hose clamp C has a small thickness. A detent 33 has a smaller number of biting protrusions 35 than the detent 8 in the first embodiment.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A hose clamp comprising:
a clamping body formed by bending a band-shaped spring plate into a generally circular shape and flexibly deformed into a contracted state and a spread state, the clamping body being attached to a hose before the hose is connected to a pipe;
a holder provided on the clamping body to hold the clamping body in the spread state in which the clamping body is loosely fitted with an end of the hose, the holder releasing the clamping body from the spread state so that the clamping body is deformed into the contracted state in which the clamping body clamps a junction of the hose and the pipe; and
a positioner positioning the clamping body at the end of the hose, the positioner including a clamp retainer attached to an outer circumference of the clamping body and a locking element which engages the hose to prevent the clamping body from displacing axially and circumferentially with respect to the hose;
wherein said locking element includes a hook engaging an end face of the hose to prevent the positioner from displacing axially with respect to the hose.

2. The hose clamp according to claim 1, wherein the locking element further includes a detent engaging an outer circumference of the hose to prevent the positioner from displacing circumferentially with respect to the hose.

3. The hose clamp according to claim 1, wherein the clamp retainer is formed into a generally semicircular shape and is spreadable so as to receive the clamping body radially outward, wherein the clamp retainer holds the clamping body with a spring force when the clamping body has been received therein, and wherein the clamping body has a generally triangular window formed through a circumferential face thereof and the clamp retainer has an engagement protrusion formed on an inner circumferential face thereof, the engagement protrusion being fitted into the triangular window of the clamping body to engage the window.

4. The hose clamp according to claim 1, wherein the hook includes an extension axially extending integrally from a front edge of the clamp retainer and a stopper formed by bending a distal end of the extension radially inward with respect to the hose so that the stopper engages an end face of the hose.

5. The hose clamp according to claim 2, wherein the detent is formed into a generally annular shape so as to be loosely fitted with the hose and has an extending slot at which the detent is spreadable and a plurality of biting protrusions formed on an inner circumferential face thereof and axially pressing an outer circumferential face of the hose.

6. The hose clamp according to claim 5, wherein the detent is adjacent to and coaxial with the clamp retainer, and the detent and the clamp retainer are spread independent of each other.

7. The hose clamp according to claim 5, wherein the detent has a circumferential edge from which the detent is fitted onto the hose and which is chamfered into a tapered shape so as to down-grade in the direction in which the detent is fitted onto the hose.

8. The hose clamp according to claim 5, wherein each of said biting protrusions has an inclined edge at the detent side from which the detent is fitted onto the hose, the inclined edge down-grading in the direction in which the detent is fitted onto the hose.

9. A hose clamp comprising:
a clamping body comprising a spring plate having a generally circular shape that is flexibly deformable into a spread state and a contracted state;
a holder on said clamping body to hold said clamping body in the spread state so that said clamping body can be loosely fitted onto an end of the hose, whereby when said holder releases said clamping body, said clamping body contracts to said contracted state to clamp the hose; and
a positioner to position said clamping body at the end of the hose, said positioner comprising a clamp retainer for receiving and retaining said clamping body and position maintaining elements which engage the hose to prevent said clamping body from displacing circumferentially and position said clamping body relative to the end of the hose by engagement with the end of the hose.

10. The hose clamp of claim 9, wherein said position maintaining elements comprise a hook to engage an end face of the end of the hose to prevent said positioner from displacing axially with respect to the hose.

11. The hose clamp of claim 9, wherein said position maintaining elements comprise a detent engaging an outer circumference of the hose to prevent said positioner from displacing circumferentially with respect to the hose.

12. The hose clamp of claim 9, wherein:
said clamp retainer has a generally semicircular shape and is radially outwardly spreadable against a spring force thereof to receive said clamping body, whereby said clamp retainer holds said clamping body with the spring force when said clamping body has been received therein;
said clamping body has a generally triangular window formed through a circumferential face thereof;
said clamp retainer has an engagement protrusion formed on an inner circumferential face; and
said engagement protrusion can be fitted into said triangular window of said clamping body to engage the window.

13. The hose clamp of claim 10, wherein said hook comprises an extension that extends axially integrally from a front edge of said clamp retainer and a stopper formed by bending a distal end of said extension radially inward with respect to the hose so that said stopper can engage the end face of the hose.

14. The hose clamp of claim 11, wherein said detent has a generally annular shape, a slot by which said detent can be spread, and a plurality of axially extending biting protrusions on an inner circumferential face thereof to axially press an outer circumferential face of the hose.

15. The hose clamp of claim 14, wherein said detent is adjacent to and coaxial with said clamp retainer and is capable of being spread independently of said clamp retainer.

16. The hose clamp of claim 14, wherein said detent has a circumferential edge from which said detent is to be fitted onto the hose, said circumferential edge being chamfered so as to radially narrow in the direction in which the hose is to be inserted into said detent.

17. The hose clamp of claim 14, wherein each of said biting protrusions has an inclined edge at a side of said detent at which the hose is to be inserted into said detent, said inclined edge radially narrowing in the direction in which the hose is to be inserted into said detent.

* * * * *